UNITED STATES PATENT OFFICE.

ANGELO G. FATICA, OF CLEVELAND, OHIO.

FOOD COMPOUND.

1,236,831.  Specification of Letters Patent.  Patented Aug. 14, 1917.

No Drawing.   Application filed December 27, 1916.   Serial No. 139,149.

*To all whom it may concern:*

Be it known that I, ANGELO G. FATICA, a citizen of the United States, residing at Cleveland, in the county of Cuyahoga and State of Ohio, have invented certain new and useful Improvements in Food Compounds, of which the following is a specification.

This invention relates to a food compound and method of making the same, and has for its object to produce a tomato compound or extract which will not spoil and which is capable of use as a dressing or sauce for meats, salads, or other foods, preserving the taste and qualities of the tomato.

In making the compound ripe or partly ripe tomatoes are allowed to stand a few days, say two to eight, in the sun, or in a dry place, after which the stems are removed and the tomatoes are washed until clean. They are then chopped in a machine or mill into pieces about the size of a pea, and then boiled in a kettle until soft. The mass is then run through a sieve to separate the seeds and skins from the pure tomato juice which passes through. This juice is then boiled in a kettle until it is quite thick, and is then poured into pans of non-oxidizing material and dried by air or artificial heat until it is about as hard as clay, or a thick paste. It is then mixed with pure olive oil in the proportion of about four drams of olive oil to six ounces of the paste. The purpose of the olive oil is to preserve the paste from desiccation, and to keep it soft and prevent it from becoming moldy and stale. The olive oil and paste are well mixed, and the compound is then ready for use, and may be stored in crocks, jars or other receptacles.

What I claim as new is:

The method of making a food compound consisting of boiling tomatoes and extracting the juice from the mass, drying said juice to the consistency of paste, and mixing said paste with olive oil.

In testimony whereof, I do affix my signature in presence of a witness.

ANGELO G. FATICA.

Witness:
  JOHN A. BOMMHARDT.